United States Patent
Komi

(10) Patent No.: US 8,517,270 B2
(45) Date of Patent: Aug. 27, 2013

(54) OPTICAL ASSEMBLY AND OPTICAL-INFORMATION-READING DEVICE

(75) Inventor: Satoshi Komi, Saitama Pref. (JP)

(73) Assignee: Optoelectronics Co., Ltd. (JP)

(*) Notice: Subject to any disclaimer, the term of this patent is extended or adjusted under 35 U.S.C. 154(b) by 0 days.

(21) Appl. No.: 13/240,411

(22) Filed: Sep. 22, 2011

(65) Prior Publication Data

US 2012/0024954 A1 Feb. 2, 2012

Related U.S. Application Data

(63) Continuation of application No. PCT/JP2010/056258, filed on Apr. 6, 2010.

(30) Foreign Application Priority Data

Apr. 6, 2009 (JP) ................................. 2009-092236
May 15, 2009 (JP) ................................. 2009-119298

(51) Int. Cl.
  *G06K 7/10* (2006.01)
  *G02B 1/06* (2006.01)
  *G02B 3/12* (2006.01)

(52) U.S. Cl.
  USPC .......................................... 235/454; 359/665

(58) Field of Classification Search
  USPC .................... 235/454; 359/665–667
  See application file for complete search history.

(56) References Cited

U.S. PATENT DOCUMENTS

| | | | |
|---|---|---|---|
| 7,408,717 B2* | 8/2008 | Renders et al. | 359/665 |
| 8,027,096 B2* | 9/2011 | Feng et al. | 359/666 |
| 2005/0199725 A1 | 9/2005 | Craen et al. | |
| 2006/0045504 A1 | 3/2006 | Zarnowski et al. | |
| 2008/0170299 A1* | 7/2008 | Kawabata | 359/665 |

FOREIGN PATENT DOCUMENTS

| | | |
|---|---|---|
| EP | 1986023 A1 | 10/2008 |
| JP | 2008-313783 A | 11/1996 |
| JP | 3083006 U | 10/2001 |
| JP | 2005-259128 | 9/2005 |
| JP | 2006-272679 | 10/2006 |
| JP | 2007-519970 | 7/2007 |
| JP | 2008-511042 | 4/2008 |
| JP | 2008-225104 A | 9/2008 |
| JP | 2008-304792 | 12/2008 |

(Continued)

OTHER PUBLICATIONS

International Search Report, dated May 18, 2010 of International Application No. PCT/JP2010/056258.

(Continued)

*Primary Examiner* — Jamara Franklin
(74) *Attorney, Agent, or Firm* — Kaplan Breyer Schwarz & Ottesen, LLP

(57) ABSTRACT

A camera module 1 is provided with liquid lens 2 that moves its focus position by an application of voltage thereto. A CMOS substrate 7 has a CMOS image sensor 70 that photographs an image focused by the liquid lens 2, and a flexible printed circuit substrate 9 which has an electrode portion 90 is connected with the liquid lens 2 and connects the liquid lens 2 and the CMOS substrate 7. A thermistor 10 that is installed in a sensor-mounting portion 93 formed on the electrode portion 90 and is connected with the CMOS substrate 7 through the flexible printed circuit substrate 9.

12 Claims, 5 Drawing Sheets

(56) References Cited

FOREIGN PATENT DOCUMENTS

| | | |
|---|---|---|
| JP | 2009-025523 | 2/2009 |
| JP | 2009-80282 A | 4/2009 |
| JP | 2009-086587 A | 4/2009 |
| WO | 2005073761 A1 | 8/2005 |
| WO | 2007094259 A1 | 8/2008 |
| WO | 2009011384 A1 | 1/2009 |
| WO | 2010117002 A1 | 10/2010 |

OTHER PUBLICATIONS

Ryoko Moriguchi, "Japanese Patent Application 2001-119298 Office Action", Jun. 16, 2009, Published in: JP.

Masahi Honda, "International Patent Application PCT/JP2010/056258 International Preliminary Report on Patentability", May 18, 2010, Publisher: WIPO, Published in: JP.

"International Patent Application PCT/JP2010/056259 International Search Report", May 18, 2010, Publisher: Japan Patent Office, Published in: JP.

Masahi Honda, "International Patent Application PCT/JP2010/056259 International Preliminary Report on Patentability", Nov. 15, 2011 Publisher: WIPO, Published in: JP.

Ryoko Moriguchi, "Corresponding Japanese Patent Application No. 2009-119299 Office Action", Jun. 16, 2009.

\* cited by examiner

OPTICAL ASSEMBLY AND OPTICAL-INFORMATION-READING DEVICE

This patent application is a continuation of International Application No. PCT/JP2010/056258 filed Apr. 6, 2010 and designating the United States of America. This international application was published in Japanese on Oct. 14, 2010 under No. WO 2010/117002. This international application is hereby incorporated by reference in its entirety.

BACKGROUND OF THE INVENTION

The present invention relates to an optical assembly, preferably a liquid-lens-optical assembly, which is equipped with a liquid lens, and an optical-information-reading device which is provided with this liquid-lens-optical assembly.

A bar code, which is one-dimensional code information for use in merchandise control, stock management or the like, has been well known. A two-dimensional code has also been known, as the code that has increased information density. Also known is a method of capturing the two-dimensional code with a solid-state image sensing device such as a CMOS image sensor or a CCD image sensor, as a device reading the two-dimensional code, performing various kinds of processing on such an image and binarizing and decoding.

The CMOS image sensor to be used in a device for reading such code information is no different in function from that with which a digital camera, or the like, is equipped so that it functions similarly to a photographer shooting an object, a scene, or the like. For example, in a case of stock management or the like, it is used for photographing both the object of interest and a location where the object is housed and storing them together with code information on a database.

Further, most portable phones are equipped with a small-sized camera using the above-mentioned CMOS image sensor. The greater part thereof not only has a camera function of the portable phone to photograph a scene or a figure, like a common digital camera, but often also includes a bar code/two-dimensional code scanner and an OCR (optical character reader).

There is a need for a focusing configuration in a device for shooting an image with a solid-state image sensing device, or an automatic focusing configuration, a so-called autofocus function. For the autofocus function, moving a location of a lens along an optical axis mechanically has been known, but it is difficult for a small sized device such as a portable phone to be equipped with such a mechanism. Thus, there is a need for configurations where a lens itself has an autofocus mechanism. As one of them, a liquid lens has been known.

FIG. 8 is a configuration diagram illustrating a liquid lens conceptually. The liquid lens 100 is configured so that water solution 101 having high conductivity and insulating oil 102 are sealed in a container 103 that has two opposed surfaces, each of which has a light-permeable transparent window. The liquid lens 100 is provided with an electrode 104a that contacts the water solution 101 and an electrode 104b that contacts the water solution 101 and the oil 102 both through an insulating portion. When the electrodes 104a, 104b are electrically charged to apply voltage to the water solution 101, a configuration of an interface 105 between the water solution 101 and the oil 102 may be altered. Such a phenomenon is referred to as "electrowetting phenomenon". It is possible to move a focus position of lens 100 by altering a curvature of the interface 105 between the water solution 101 and the oil 102 so that light passing through the lens can come into focus at different distances from the lens.

Such liquid lenses have been applied to a camera module, a code scanner, and the like, as disclosed, for example, in Patent Document 1 (see below). Providing a temperature sensor to perform a temperature-compensating focusing control has also been disclosed (for example, see Patent Document 2). Further, providing a cooling mechanism for a liquid lens has been disclosed (For example, see Patent Document 3).

Patent Documents

Patent Document 1: Japanese Patent Application Publication No. 2005-259128.

Patent Document 2: Japanese Patent Kouhyou Publication No. 2008-511042.

Patent Document 3: Japanese Patent Application Publication No. 2008-304792.

A camera module with a liquid lens is provided with parts which constitute a heat source, such as a driving part of a solid-state image sensing device. The liquid lens, having voltage applied thereto is configured so that curvature of its interface varies because of temperature variation, thereby requiring temperature-compensation, as in patent document 2. However, it is difficult to mount a temperature sensor on the liquid lens itself because the liquid lens is small, its diameter being about several millimeters. On the other hand, if a temperature sensor were mounted on a substrate mounting the solid-state image sensing device, it is susceptible to any heat generated in other electric parts, so that it is impossible to detect temperature correctly.

Patent document 3 provides a cooling mechanism transferring heat to the outside using two temperature sensors and two peltiert elements around the liquid lens, but configuration is complex so that a mechanism relating to temperature detection and/or cooling occupies a large mounting area.

Further, in a popular camera, a technology is proposed in which images are captured in succession and decoding is performed on only focused images, but it takes a lot of time to capture the images up to the decoding thereof so that it may not be applied to a code scanner that manages articles and/or goods.

The present invention solves such a problem and has an object to provide a liquid-lens-optical assembly which can detect temperature of a liquid lens appropriately with a simple configuration to cope with a temperature changes, and an optical-information-reading device which is provided with this liquid-lens-optical assembly.

SUMMARY

In order to solve the above-mentioned problem, embodiments of the present invention include a liquid-lens-optical assembly that is provided with a liquid lens in which first liquid and second liquid, which have different optical refractive indexes and are not miscible, form an interface between them, are sealed in a container. The liquid lens has a first electrode and a second electrode to which voltage for controlling a configuration of the interface between the first liquid and the second liquid is applied. A connection member has an electrode portion in which a first electrode part that is connected with the first electrode of the liquid lens and a second electrode part that is connected with the second electrode thereof are formed, and a temperature-detecting means is installed in a sensor-mounting portion formed on the electrode portion.

Embodiments of the present invention also includes an optical-information-reading device that is provided with a liquid lens in which fust liquid and second liquid, which have different optical refractive indexes and are not, miscible form an interface between them, are sealed in a container. The liquid lens has a first electrode and a second electrode to which voltage for controlling a configuration of the interface between the first liquid and the second liquid is applied. A photograph-controlling portion has a solid-state image sensing device photoelectrically converting an optical signal passing through the liquid lens. A connection member has an electrode portion with a first electrode part that is connected with the first electrode of the liquid lens and a second electrode part that is connected with the second electrode thereof, the connection member connecting the liquid lens and the photograph-controlling portion Temperature-detecting means that is installed in a sensor-mounting portion formed on the electrode portion is connected with the photograph-controlling portion through the connection member.

In the liquid-lens-optical assembly and the optical-information-reading device according to an embodiment of the present invention, by adjusting a focus position of the liquid lens derived from information on a distance from an object to be measured using information on the temperature detected by the temperature-detecting means, correct autofocus is realized. By permitting the temperature-detecting means to be installed in the electrode portion of the connection member connected with the liquid lens, it is possible to dispose the temperature-detecting means near the liquid lens with a simple configuration and to detect the temperature around the liquid lens appropriately.

Making use of the present invention, it is possible to detect the temperature around the liquid lens appropriately by installing the temperature-detecting means on the electrode portion of the connection member connected with the liquid lens, thereby allowing a distinct picture to be captured by transmitting the temperature information. Further, the number of parts necessary for detecting the temperature of a mounting space may be restricted to its minimum and assembly of the whole thereof may be also made easier, thereby enabling efficiency of mass production thereof to be improved.

DETAILED DESCRIPTION OF TILE PREFERRED EMBODIMENTS

The following will describe embodiments of a camera module which is equipped with a liquid-lens-optical assembly according to the present invention and an optical-information-reading device which is provided with the camera module with reference to drawings.
(Configuration Example of Camera Module as an Embodiment)

Figure 1:
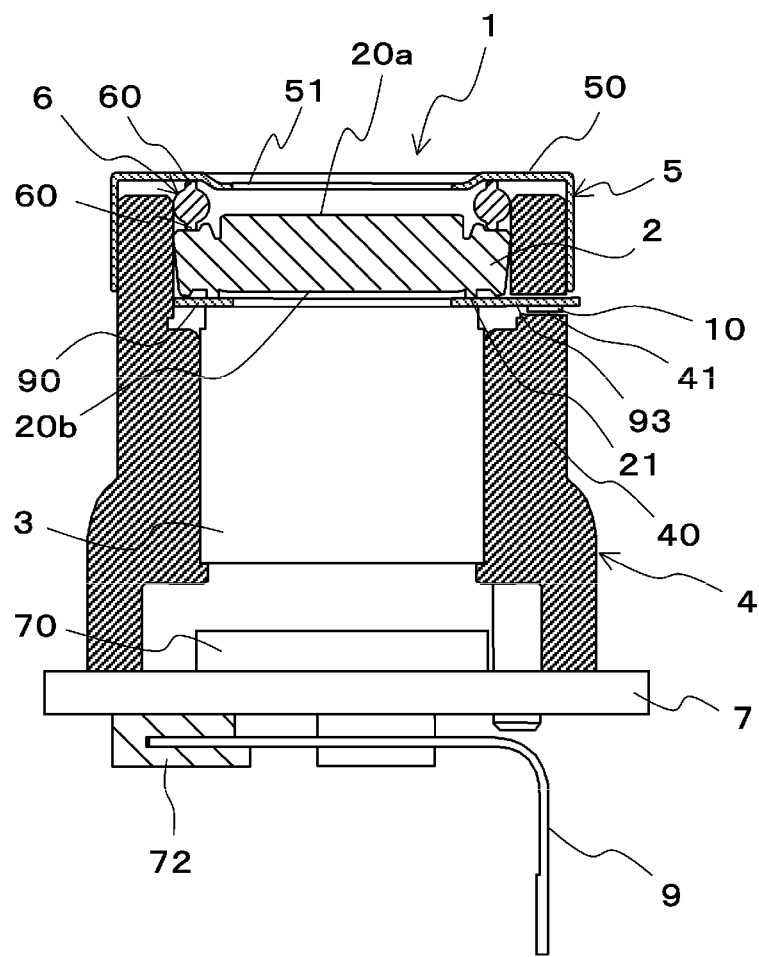
FIG. 1 is a sectional diagram showing an example of a camera module as a present embodiment.
Figures 2, 3:
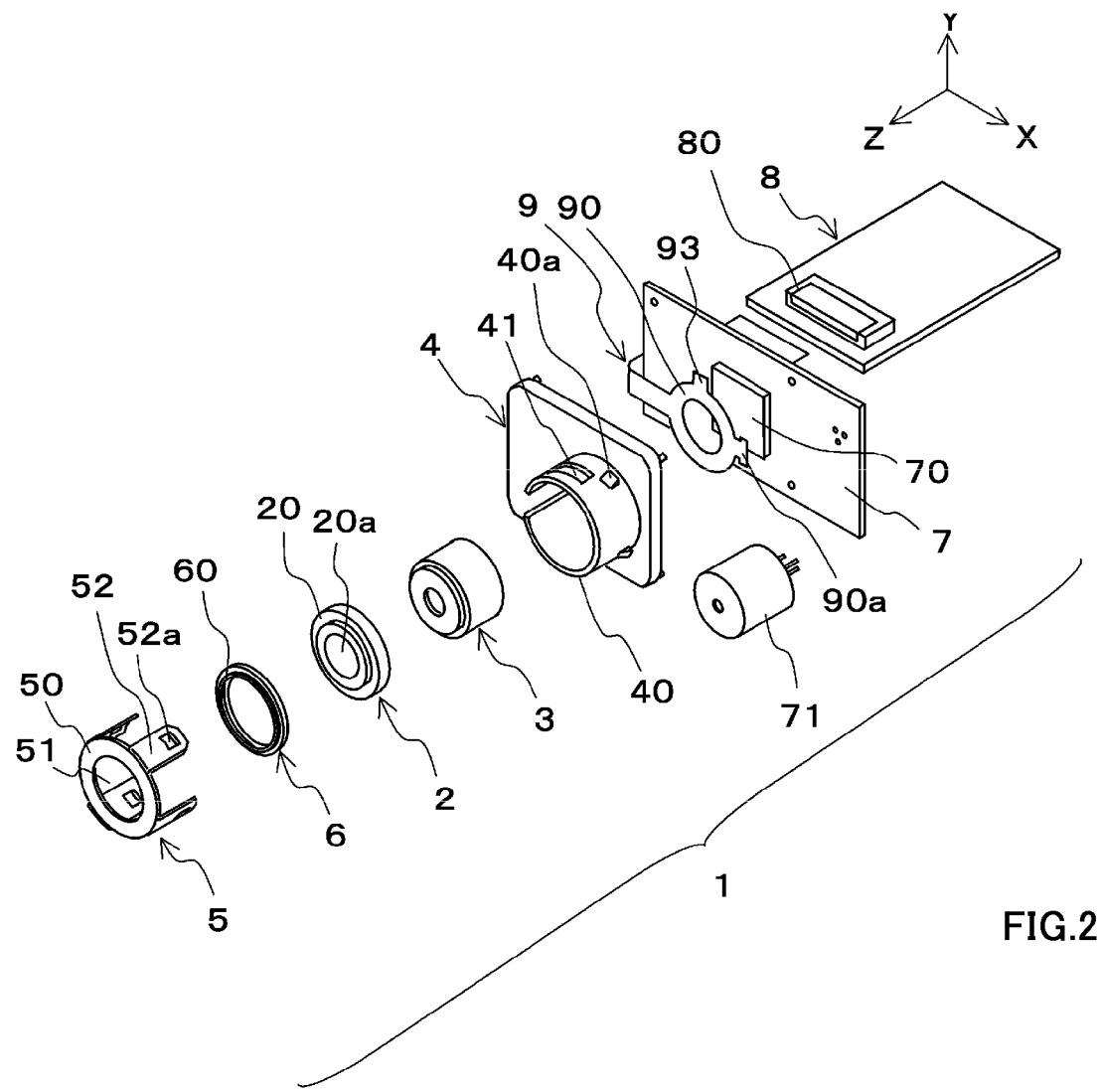
FIG. 2 is an exploded perspective diagram showing an example of the camera module of the present embodiment.
FIG. 3 is an exterior and perspective diagram showing an example of a liquid lens constituting part of the camera module of the present embodiment.
Figure 4:
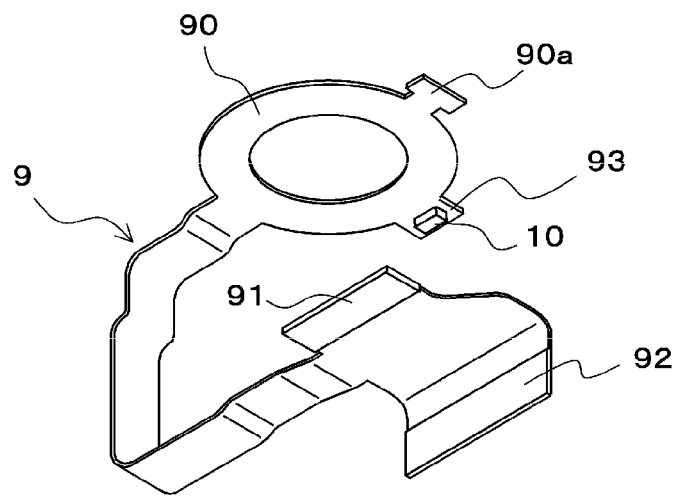
FIG. 4 is a perspective diagram showing an example of a flexible printed circuit substrate constituting part of the camera module of the present embodiment.
Figure 5A:
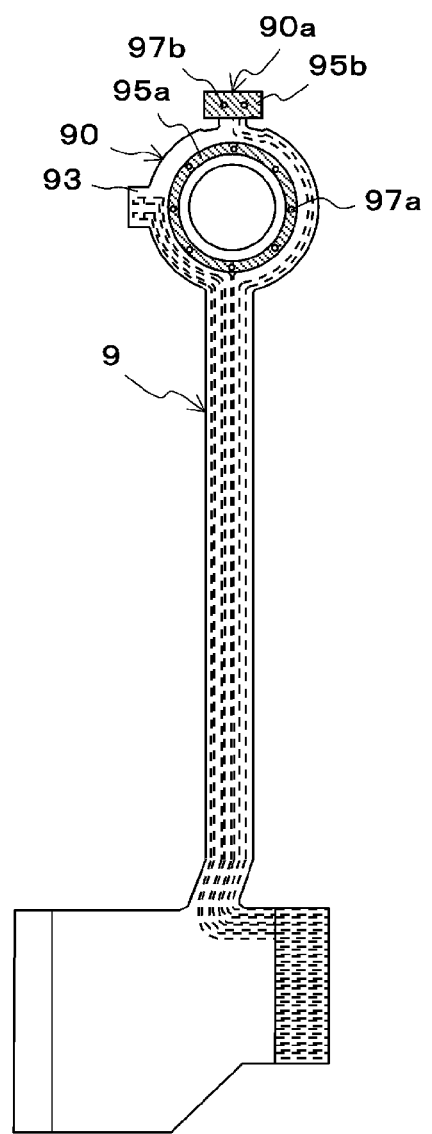
FIG. 5A is a plan diagram showing an example of the flexible printed circuit substrate constituting part of the camera module of the present embodiment.
Figure 5B:
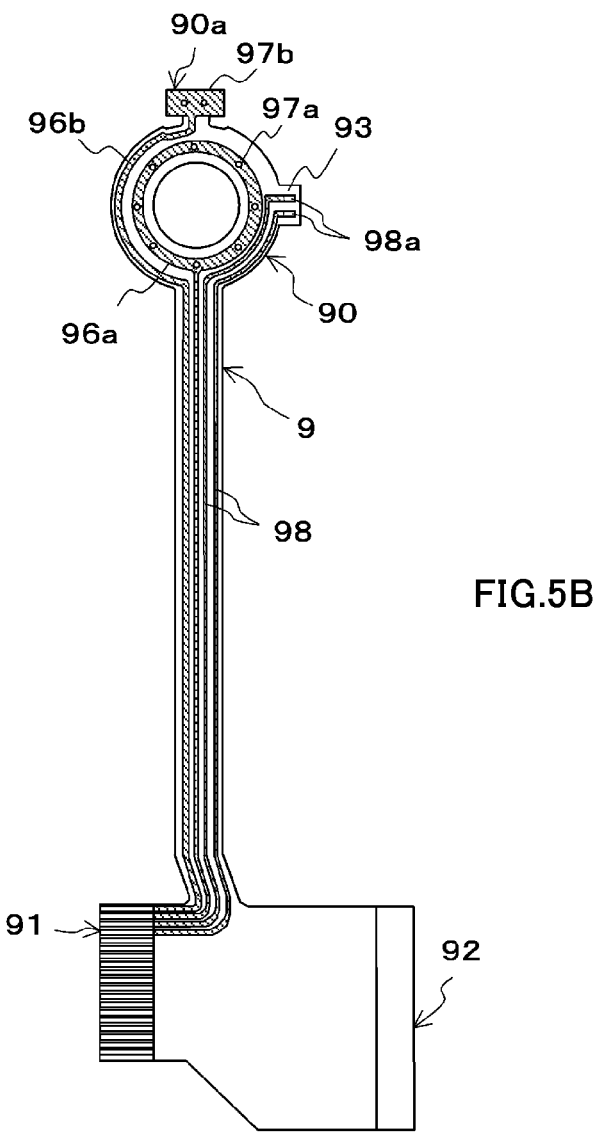
FIG. 5B is a plan diagram showing an example of the flexible printed circuit substrate constituting part of the camera module of the present embodiment.
Figure 6:
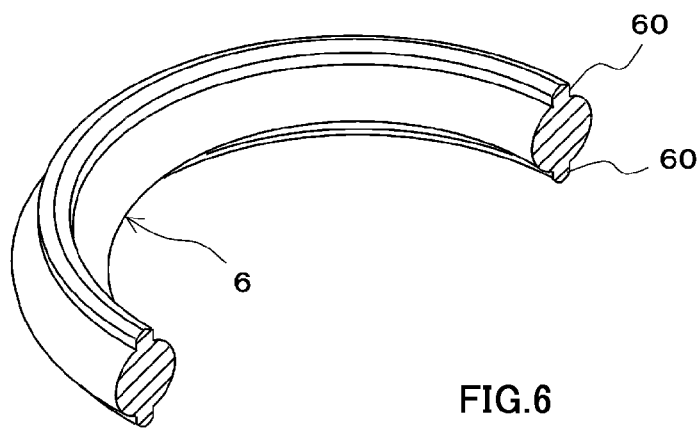
FIG. 6 is a sectional and perspective diagram showing an example of a packing constituting part of the camera module of the present embodiment.

FIG. 1 is a sectional diagram showing an example of the camera module as the present embodiment; FIG. 2 is an exploded perspective diagram showing an example of the camera module as the present embodiment; FIG. 3 is an exterior and perspective diagram showing an example of a liquid lens constituting the camera module as the present embodiment; FIG. 4 is a perspective diagram showing an example of a flexible printed circuit substrate constituting the camera module as the present embodiment; FIGS. 5A and 5B are plan diagrams each showing an example of the flexible printed circuit substrate constituting the camera module as the present embodiment; and FIG. 6 is a sectional and perspective diagram showing an example of a packing constituting the camera module as the present embodiment.

The camera module 1 as the present embodiment is provided with a thermistor 10 detecting a temperature of the periphery of the liquid lens 2 and adjusts a focus position of the liquid lens 2 derived from information on a distance from an object to be measured using information on the temperature detected by the thermistor 10 to realize correct autofocus. In the camera module 1, by providing a flexible printed circuit substrate 9 connected to an electrode of the liquid lens 2 with the thermistor 10, it becomes possible to detect the temperature of the periphery of the liquid lens 2 appropriately.

Figure 8:
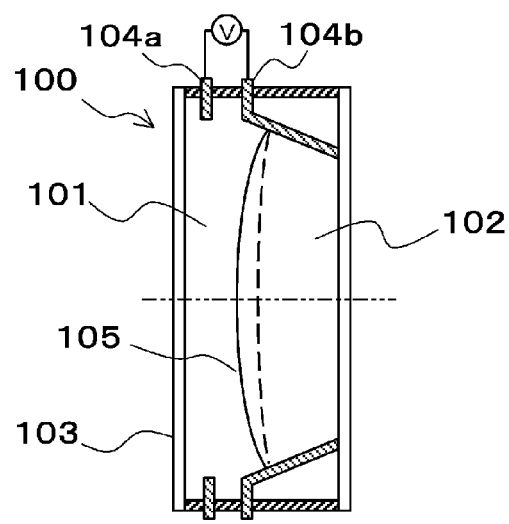
FIG. 8 is a configuration diagram for illustrating an example of the liquid lens.

In the camera module 1 as the present embodiment, the liquid lens 2 and a master lens 3 are mounted to a camera body 4. The liquid lens 2 has a transparent material through which light is transmitted, and high electroconductive aqueous solution that is an example of first liquid and insulating oil that is an example of second liquid are sealed in a cylindrical container 20 in which an incident plane 20a and an exit plane 20b are formed. The inside of the liquid lens 2 has a configuration as, for example, that described in FIG. 8 so that the aqueous solution 101 and the oil 102 are separated from each other in a direction along an optical axis of the liquid lens 2 and are not miscible, to form an interface 105 therebetween through which light is transmitted. The aqueous solution and the oil sealed in the liquid lens 2 have different optical refractive indexes so that light transmitted from the incident plane 20a to the exit plane 20b is refracted at the interface between the aqueous solution and the oil.

In the liquid lens 2, in this embodiment, a first electrode 21 is formed on an outer portion from the exit plane 20b and a second electrode 23, which is insulated from the first electrode 21 through an insulating portion 22, is formed on the whole or a part of a circumference thereof. The first electrode 21 is connected to, for example, the electrode 104a, which has been described on FIG. 8, and the second electrode 23 is connected to the electrode 104b. It is to be noted that, in an alternate configuration, the first electrode 21 may be connected to the electrode 104b and the second electrode 23 may be connected to the electrode 104a. In the liquid lens 2 of this embodiment, in a state where the first electrode 21 and the second electrode 23 are not electrically charged, the interface between the aqueous solution and the oil is kept to a set fixed configuration thereof and then, when the first electrode 21 and the second electrode 23 are electrically charged, the configuration of the interface between the aqueous solution and the oil varies according to voltage applied onto the aqueous solution. This allows a refractive angle of light passing through the lens to vary so that a focus position is switchable.

A master lens is an example of an optical member and is configured so that a single optical lens or plural optical lenses, which are not shown, are enclosed in a cylindrical housing.

The camera body 4 is an example of a supporting member and is provided with a lens-mounting portion 40 in which a cylindrical space that is confomiable to configurations of the cylindrical liquid lens 2 and the master lens 3 is formed. When the liquid lens 2 and the master lens 3 are fitted into the lens-mounting portion 40 in stacked arrangement in the direction of the optical axis. Their positions are limited along X-Y axes that are perpendicular to the optical axis, thereby allowing the optical axes of the liquid lens 2 and the master lens 3 to be aligned with each other.

The camera module 1 is provided with a lens cover 5, which is mounted to the lens-mounting portion 40, and the packing 6, which fixes the liquid lens 2 and the master lens 3. The lens cover 5 is provided with a lens-pushing part 50, a window 51 fomied radially inward of the lens-pushing part 50 and legs 52 formed radially outward of the lens-pushing part 50. The window 51 of the lens cover 5 is configured so that an opening is formed at a portion thereof that is opposed to the incident plane 20*a* of the liquid lens 2 and a size of the opening is determined so as not to block the light by the predetermined angle of field.

When the lens cover 5 is mounted on the lens-mounting portion 40, claim portions 40*a*, formed so as to project from a circumference of the lens-mounting portion 40, are fitted into recess portions 52*a* provided on the legs 52 of the lens cover 5 so that the lens cover 5 is fixed to the lens-mounting portion 40.

The packing 6 is an example of an elastic locating member and is made of silicon. The packing 6 has a ring shape that is conformable to the shape of an internal circumference of the lens-mounting portion 40 and has ring-shaped protrusions 60 on upper and lower surfaces thereof which are opposed to the incident plane 20*a* of the liquid lens 2 and the lens-pushing part 50 of the lens cover 5. The packing 6 is configured with its thickness between the protrusions 60 being set so that, when the packing 6 is disposed between the lens cover 5 and the liquid lens 2, which are mounted to the lens-mounting portion 40, one protrusion 60 comes into contact with a portion of the liquid lens 2 radially outward of the incident plane 20*a* and the other protrusion 60 comes into contact with the lens-pushing part 50 of the lens cover 5.

The camera module 1 is provided with a CMOS substrate 7 mounting a CMOS image sensor 70, which is an example of a solid-state image sensing device photoelectrically converting an optical signal, a main substrate 8 performing signal processing, and the flexible printed circuit (FPC) substrate 9 connecting the liquid lens 2 with the CMOS substrate 7 and the main substrate 8. Onto the CMOS substrate 7, the camera body 4 is attached. On the CMOS substrate 7, a distance-measuring portion 71 having a laser-light-receiving or emitting part or the like is also mounted. On the main substrate 8, a circuit or the like decoding the signal photoelectrically converted by the CMOS image sensor 70 is installed. In this embodiment, the CMOS substrate 7 and the main substrate 8 are formed as separate substrates and constitute a photograph-controlling portion. It, however, is to be noted that the CMOS substrate 7 and the main substrate 8 may be formed as a single substrate.

The flexible printed circuit substrate 9 is an example of connection member and is provided with a ring-shaped electrode portion 90 with a first electrode pattern 95*a*, which is an example of a first electrode portion connected to the first electrode 21 of the liquid lens 2, and a second electrode pattern 95*b*, which is an example of a second electrode portion connected to a second electrode 23 thereof, being formed so as to be insulated from each other on one surface thereof shown in FIG. 5A. The electrode portion 90 is configured to have a shape that is fitted into the lens-mounting potion 40 of the camera body 4. The flexible printed circuit substrate 9 is also provided with an electrode portion 91 connected to a connector 72 of the CMOS substrate 7 and an electrode portion 92 connected to a connector 80 of the main substrate 8.

The flexible printed circuit substrate 9 is configured with a first wiring pattern 96*a* connected to the first electrode pattern 95*a* and a second wiring pattern 96*b* connected to the second electrode pattern 95*b* being formed so as to be insulated from each other on the other surface thereof shown in FIG. 5B.

The first electrode pattern 95*a* has a shape that is conformable to a shape of the first electrode 21 of the liquid lens 2. A part of the first wiring pattern 96*a* formed on the electrode portion 90 has also a ring shape with the same diameter as that of the first electrode pattern 95*a*.

The first electrode pattern 95*a* formed on one surface of the flexible printed circuit substrate 9 and the first wiring pattern 96*a* formed on the other surface of the flexible printed circuit substrate 9 are disposed as to become a ring shape that is conformable to a shape of, for example, the first electrode pattern 95*a* and they are electrically connected to each other through a plurality of holes 97*a* that pass through the flexible printed circuit substrate 9.

In the flexible printed circuit substrate 9, an electrode portion 90*a* is formed so as to project a part of the circumference of the electrode portion 90 outward so that the second electrode pattern 95*b* is formed on the electrode portion 90*a*. A part of the second wiring pattern 96*b* formed on the electrode portion 90 has an arc shape by way of the exterior of the first wiring pattern 96*a* and connects the electrode portion 90*a*.

Then, the second electrode pattern 95*b* formed on one surface of the flexible printed circuit substrate 9 and the second wiring pattern 96*b* formed on the other surface of the flexible printed circuit substrate 9 are electrically connected to each other through a single hole 97*b* or a plurality of via holes 97*b* that passes or pass through the flexible printed circuit substrate 9.

The camera module 1 is provided with the thermistor 10 detecting the temperature of the liquid lens 2 and the proximity of the liquid lens 2. The thermistor 10 is an example of temperature-detecting means and is installed in a sensor-mounting portion 93 of the flexible printed circuit substrate 9, which is formed so as to project from the electrode portion 90 outward. On the flexible printed circuit substrate 9, a wiring pattern 98 having an electrode pattern 98*a* for connecting the thermistor 10 is formed on the other surface thereof shown in FIG. 5B and the thermistor 10 is installed in the electrode pattern 98*a* by soldering or the like. Any information on the temperature detected by the thermistor 10 is transmitted to the main substrate 8 through the flexible printed circuit substrate 9, and it is controlled so that a predetermined voltage is applied across the first electrode pattern 95*a* and the second electrode pattern 95*b* of the flexible printed circuit substrate 9.

In the camera module 1, the liquid lens 2 and the master lens 3 are stacked with the first electrode 21 of the liquid lens 2 being opposite master lens 3. The electrode portion 90 of the flexible printed circuit substrate 9 is interposed between the liquid lens 2 and the master lens 3. The liquid lens 2 and the master lens 3, which have been stacked with the electrode portion 90 therebetween, are fitted into the lens-mounting portion 40 of the camera body 4.

When the packing 6 is fitted into the lens-mounting portion 40 between the lens cover 5 and the liquid lens 2 and the lens cover 5 is mounted onto the lens-mounting portion 40, one protrusion 60 of the packing 6 comes into contact with a portion of the liquid lens 2 radially outward from the incident plane 20a and the other protrusion 60 comes into contact with the lens-pushing part 50 of the lens cover 5.

This enables the lens cover 5 and the liquid lens 2 to be located so that a load applied to the liquid lens 2 is minimized, thereby limiting the liquid lens 2 and the master lens 3 by the packing 6 to their locations on the Z-axis direction along the optical axis. The liquid lens 2 is also pushed by the packing 6 toward the master lens 3 so that the first electrode 21 of the liquid lens 2 and the first electrode pattern 95a of the electrode portion 90 are electrically connected to each other. The material of packing 6 is silicon that is easy to be molded and has suitable solidity so that it is suitable for a member supporting the liquid lens 2.

Although the load applied to the liquid lens 2 in the Z-axis direction is regulated so as to be limited up to about 0.5 kg (5N), if a container of the liquid lens other than electrode portions thereof is molded by, for example, plastic materials (ABS resin) when the lens cover is configured so as to push it directly, a load of about several tens kg is applied thereto under a deformation of even 0.1 mm, which exceeds substantially the allowed load of the liquid lens 2.

As opposed to this, it is possible to restrain a fluctuation of a load to about 0.2 kg under the deformation of 0.1 mm by inserting the packing 6 between the liquid lens 2 and the lens cover 5. It is also possible to restrain a load applied to the liquid lens 2 below 0.5 kg and leave no space by configuring so that the packing 6 comes into contact with the liquid lens 2 through its protrusion 60 even if there is a tolerance of about ±0.2 mm.

When the liquid lens 2, the master lens 3 and the electrode portion 90 of the flexible printed circuit substrate 9 are fitted within an internal circumference of the lens-mounting portion 40, the electrode portion 90a projecting from the electrode portion 90 outward is folded and is positioned between the circumference of the liquid lens 2 and the internal circumference of the lens-mounting portion 40. This enables the second electrode 23 of the liquid lens 2 and the second electrode pattern 95b of the electrode portion 90a to be electrically connected. Fitting the liquid lens 2, the master lens 3 and the electrode portion 90 within the internal circumference of the lens-mounting portion 40 enables the liquid lens 2, the master lens 3 and the electrode portion 90 to be limited in their positions in the X-Y axis direction which is perpendicular to the optical axis. This avoids generating a short circuit between the second electrode 23 of the liquid lens 2 and the first electrode pattern 95a of the electrode portion 90.

Since the thermistor 10 is installed in the sensor-mounting portion 93 projecting from the electrode portion 90 connected to the liquid lens 2 in the flexible printed circuit substrate 9, it is located near the liquid lens 2 after installing the electrode portion 90 between the liquid lens 2 and the master lens 3 and attaching the flexible printed circuit substrate 9 to the lens-mounting portion 40. In the camera body 4, an aperture portion 41 is formed in the lens-mounting portion 40 so as to be conformable to the sensor-mounting portion 93 and the thermistor 10 is mounted in the aperture portion 41 of the lens-mounting portion 40, as shown in FIG. 1.

This enables the thermistor 10 to be disposed nearer to the liquid lens 2 than the outside of the lens-mounting portion 40, thereby allowing the occupied mounting space to be restricted to its minimum. Further, limiting the position of the electrode portion 90 in the inner circumference of the lens-mounting portion 40 restrains the thermistor 10 from colliding with the liquid lens 2, even when disposing the thermistor 10 near the liquid lens 2.

Further, the action of assembling the liquid lens 2, the master lens 3 and the flexible printed circuit substrate 9 into the camera body 4 fixes the thermistor 10 near the liquid lens 2, thereby enabling installing operations to be easily done. Electric connection of thermistor 10 is achieved by the flexible printed circuit substrate 9, so that wiring that is different from the wiring driving the liquid lens 2 is not necessary, simplifying mounting operations.

The camera module 1 is configured so that the camera body 4 is attached to the CMOS substrate 7 and light that is incident on the liquid lens 2 travels through the liquid lens 2 and the master lens 3 to become incident or the CMOS image sensor 70.

[A Configuration Example of an Optical-Information-Reading Device as the Present Embodiment]

The above-mentioned camera module 1 can form, on the CMOS image sensor 70, an image of a remote object to be photographed by controlling the voltage applied to the liquid lens 2. This voltage is controlled based on the information on the temperature near the liquid lens 2, as detected by the thermistor 10, and the information on the distance from the object to be photographed, as measured by the distance-measuring portion 71. The following will describe the optical-information-reading device equipped with such a camera module 1.

Figure 7:
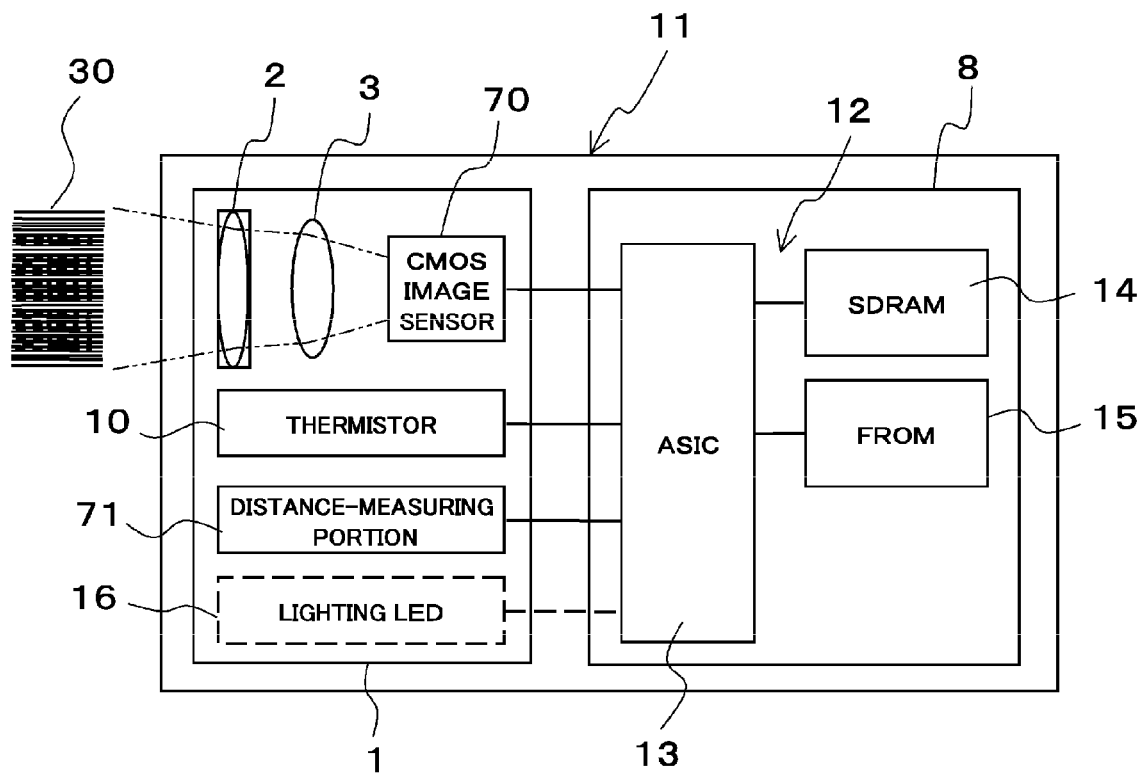
FIG. 7 is a functional block diagram showing an example of an optical-information-reading device embodying the present invention

FIG. 7 is a functional block diagram showing an example of the optical-information-reading device as the present embodiment. The optical-information-reading device 11 as the present embodiment is provided with the above-mentioned camera module 1 and a decoder 12 mounted on the main substrate 8. The optical-information-reading device 11 has a configuration so that the above-mentioned components are installed, for example, in a case (not shown), and a user can photograph while he or she holds it in his or her hand.

The decoder 12 is an example of controlling means and is provided with an application specific integrated circuit (ASIC) 13 that controls photographing, adjustment, decoding, data transmission, and the like, to be performed in the camera module 1. In the ASIC 13, writing, reading, and the like, of various kinds of data are performed to/from the SDRAM 14, FROM 15, and the like. The optical-information-reading device 11 is a scanner that is capable of reading a bar code and two-dimensional code but it also can read characters if OCR software is loaded therein.

Here, a lighting LED 16 is provided for irradiating guide light that shows a code symbol 30 to be read but the lighting LED 16 is suitably provided and may be omitted due to a shape of the device or a use purpose thereof. The ASIC 13 also may be a combination of CPU and an LSI such as field programmable gate army (FPGA).

The optical-information-reading device 11 photographs when reflected light from the remote code symbol 30 focuses on the CMOS image sensor 70, namely, so-called focus is performed. This is because it is impossible to decode contents of the code symbol 30 unless the image is clearly captured.

The optical-information-reading device 11 measures the distance from the code symbol 30 to be photographed and controls the liquid lens 2 so as to become focused on the measured distance. For this reason, a distance-measuring portion 71 is provided in the camera module 1. Two technologies for measuring the distance by laser are well known. One is a pulsing technology which obtains a distance by measuring delayed time between a start of laser pulse and a return of reflection thereof. The other is a parallax technology which produces a beam to form a spot on an object to be photographed and measures the position of the detected spot on the object to be photographed. The distance from the object to be photographed is determined from the position of the detected spot. Although the method of measuring the distance is not limited thereto, either of these methods to measure the distance is preferably, programmed in ASIC 13.

A relationship of the voltage applied to the liquid lens 2 and its focus position is previously obtained. This enables voltage information based on a distance to the code symbol 30 measured by the distance-measuring portion 71 to be obtained by storing in the ASIC 13 a relation table of the distance to the code symbol 30 to be photographed and the voltage to be applied to the liquid lens 2.

On the other hand, in the liquid lens 2, the focus position varies due to the temperature thereof even if similar voltage is applied thereto. Thus, a correction table based on periphery temperature of the liquid lens 2 has been stored in the ASIC 13. Although the liquid lens 2 needs a period of waiting time after the voltage is applied thereto and prior to photographing a picture, this period of waiting time varies due to the temperature thereof. Generally, the higher the temperature, the shorter the period of waiting time; for example, the period of waiting time at 60° C. is much shorter than the period of waiting time at 25° C. A relation table of the periphery temperature of the liquid lens 2 and the period of waiting time has been stored in the ASIC 13.

In the camera module 1 according to the present embodiment, a part of the electrode portion 90 of the flexible printed circuit substrate 9 that is connected with the liquid lens 2 projects so as to form the sensor-mounting portion 93, in which the thermistor 10 is installed. This enables the thermistor 10 to be disposed at a place near the liquid lens 2 where it is not subject to influence by heat from the CMOS image sensor 70, other electric circuits and the like, thereby allowing the variation of temperature in the liquid lens 2 itself to be detected by the thermistor 10.

Thus, by referring to the relation table of the distance to the code symbol 30 and the voltage to be applied to the liquid lens 110, the correction table based on the periphery temperature of the liquid lens 2 and the relation table relating the periphery, temperature of the liquid lens 2 and the period of waiting time prior to photographing, an optimal focus adjustment is realized so that it is possible to capture a clear picture.

The present invention is applicable to a bar code reader, a two-dimensional code reader or the like, and can realize autofocus with a small device.

Description of Reference Codes
  1: Camera Module;
  2: Liquid Lens;
  20: Container;
  21: First Electrode;
  3: Master Lens;
  4: Camera Body;
  40: Lens-mounting Portion;
  41: Aperture Portion;
  5: Lens Cover;
  6: Packing;
  60: Protrusions;
  7: CMOS Substrate;
  70: CMOS Image Sensor;
  8: Main Substrate;
  9: Flexible Printed Circuit Substrate;
  90: Electrode portion; and
  93: Sensor-mounting Portion

The invention claimed is:

1. A liquid-lens-optical assembly comprising:
  a liquid lens having an optical axis, wherein the liquid lens includes a closed space containing first and second immiscible liquids having different optical refractive indexes and forming an interface between the first and second immiscible liquids;
  first and second electrodes, each in communication with one of the liquids, to which voltage for controlling a configuration of the interface between the first liquid and the second liquid is applied;
  an optical member having an optical axis;
  a lens-mounting portion that mounts the liquid lens and the optical member so that the optical axes of the liquid lens and optical member are aligned;
  a connection member having a first electrode part connected with the first electrode of the liquid lens and a second electrode part connected with the second electrode thereof, wherein the connection member comprises an electrode portion shaped to conform to a shape of the lens-mounting portion and mounted between the liquid lens and the optical member; and
  a temperature detector proximate the liquid lens and in thermal communication therewith, the temperature detector being in electrical contact with the connection member.

2. The liquid-lens-optical assembly according to claim 1 wherein the electrode portion has a ring-shaped configuration that is conformable to a configuration of the lens-mounting portion.

3. The liquid-lens-optical assembly according to claim 1 or 2 wherein the lens-mounting portion includes an opening dimensioned and shaped to receive at least part of the temperature detector.

4. The liquid-lens-optical assembly according to claim 3 wherein the connection member is a flexible printed circuit substrate.

5. The liquid-lens-optical assembly according to claim 1 or 2 wherein the connection member has an electrode portion containing the first and second electrode parts and a sensor-mounting portion for the temperature detector, the sensor-mounting portion being formed so as to project from the electrode portion and the lens-mounting portion being provided with an opening into which the thermistor is installed in the sensor-mounting portion.

6. The liquid-lens-optical assembly according to claim 5 wherein the connection member is a flexible printed circuit substrate.

7. The liquid-lens-optical assembly according to claim 1 or 2 wherein the connection member is a flexible printed circuit substrate.

8. An optical-information-reading device comprising:
  a liquid lens having an optical axis, wherein the liquid lens includes a closed space containing first and second immiscible liquids having different optical refractive indexes and forming an interface between the first and second immiscible liquids;
  first and second electrodes, each in communication with one of the liquids, to which voltage for controlling a configuration of the interface between the first liquid and the second liquid is applied;
  an optical member having an optical axis;
  a lens-mounting portion that mounts the liquid lens and the optical member so that optical axes of the liquid lens and optical member are aligned;
  a photograph-controlling portion that has a solid-state image sensing device photoelectrically converting an optical signal, the sensing device being positioned so that light propagating through the liquid lens impinges thereon;

a connection member having a first electrode part connected with the first electrode of the liquid lens and a second electrode part connected with the second electrode thereof, wherein the connection member connects the liquid lens and the photograph-controlling portion, and wherein the connection member comprises an electrode portion shaped to conform to a sham of the lens-mounting portion and mounted between the liquid lens and the optical member; and a temperature detector proximate the liquid lens and in thermal communication therewith, the temperature detector being in electrical contact with the connection member, the temperature detector being connected with the photograph-controlling portion through the connection member.

9. The optical-information-reading device according to claim 8 wherein the photograph-controlling portion controls the voltage applied to the liquid lens based on temperature of the periphery of the liquid lens, the temperature being detected by the temperature detector.

10. The optical-information-reading device according to claim 8 wherein the electrode portion has a ring-shaped configuration that is conformable to a configuration of the lens-mounting portion.

11. The optical-information-reading device according to claim 10 wherein the sensor-mounting portion is formed as a projecting part of the electrode portion.

12. The optical-information-reading device according to claim 8 wherein the sensor-mounting portion is formed as a projecting part of the electrode portion.

* * * * *